United States Patent
Cai et al.

(10) Patent No.: US 12,437,152 B2
(45) Date of Patent: Oct. 7, 2025

(54) HEADWORD EXTRACTION METHOD AND APPARATUS, DEVICE, AND STORAGE MEDIUM

(71) Applicant: Tencent Technology (Shenzhen) Company Limited, Shenzhen (CN)

(72) Inventors: Bolun Cai, Shenzhen (CN); Xiaoyi Jia, Shenzhen (CN); Haoyu Li, Shenzhen (CN); Yugeng Lin, Shenzhen (CN); Dianping Xu, Shenzhen (CN); Huajie Huang, Shenzhen (CN); Chen Ran, Shenzhen (CN); Yike Liu, Shenzhen (CN); Lijian Mei, Shenzhen (CN); Zhikang Tan, Shenzhen (CN); Yanhua Cheng, Shenzhen (CN); Jinchang Xu, Shenzhen (CN); Minhui Wu, Shenzhen (CN); Mei Jiang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 634 days.

(21) Appl. No.: 17/857,841

(22) Filed: Jul. 5, 2022

(65) Prior Publication Data
US 2022/0343074 A1 Oct. 27, 2022

Related U.S. Application Data

(63) Continuation of application No. PCT/CN2021/096762, filed on May 28, 2021.

(30) Foreign Application Priority Data
Jun. 1, 2020 (CN) .......................... 202010486516.7

(51) Int. Cl.
G06F 40/279 (2020.01)
G06F 40/205 (2020.01)
G06F 40/30 (2020.01)

(52) U.S. Cl.
CPC .......... *G06F 40/279* (2020.01); *G06F 40/205* (2020.01); *G06F 40/30* (2020.01)

(58) Field of Classification Search
None
See application file for complete search history.

(56) References Cited

U.S. PATENT DOCUMENTS

2017/0228461 A1 8/2017 Lev
2019/0102373 A1* 4/2019 Li ........................ G06F 40/232

FOREIGN PATENT DOCUMENTS

CN 105260359 A 1/2016
CN 110008401 A 7/2019
(Continued)

OTHER PUBLICATIONS

Wang Tao, English translation of CN110633398: Method for confirming central word, ip.com, pp. 1-17 (Year: 2019).*
(Continued)

*Primary Examiner* — Antim G Shah
(74) *Attorney, Agent, or Firm* — Morgan, Lewis & Bockius LLP

(57) ABSTRACT

Embodiments of this application disclose a headword extraction method performed by a computer device. The method includes: obtaining a sentence feature of a target sentence and word features of a plurality of words in the target sentence; extracting semantics of the sentence feature of the target sentence to obtain a semantic feature of the target sentence, and extracting semantics of the word feature of each word to obtain a semantic feature of the word; obtaining a respective matching degree between the semantic feature of each of the plurality of words and the semantic feature of the target sentence; and determining, among the plurality of words in the target sentence, a word with a largest corresponding matching degree as a headword of the (Continued)

target sentence. The method can improve the accuracy of headwords extracted from the target sentence.

18 Claims, 9 Drawing Sheets

(56) References Cited

FOREIGN PATENT DOCUMENTS

| CN | 110633398 A | 12/2019 |
|---|---|---|
| CN | 110795613 A | 2/2020 |
| CN | 110827831 A | 2/2020 |
| CN | 111062210 A | 4/2020 |
| CN | 111597823 A | 8/2020 |

OTHER PUBLICATIONS

Tencent Technology, ISR, PCT/CN2021/096762, Aug. 31, 2021, 3 pgs.
Tencent Technology, WO, PCT/CN2021/096762, Aug. 30, 2021, 4 pgs.
Tencent Technology, IPRP, PCT/CN2021/096762, Dec. 6, 2022, 5 pgs.

* cited by examiner

HEADWORD EXTRACTION METHOD AND APPARATUS, DEVICE, AND STORAGE MEDIUM

CROSS-REFERENCE TO RELATED APPLICATIONS

This application is a continuation application of PCT Patent Application No. PCT/CN2021/096762, entitled "HEAD WORD EXTRACTION METHOD AND APPARATUS, DEVICE, AND STORAGE MEDIUM" filed on May 28, 2021, which claims priority to Chinese Patent Application No. 202010486516.7, filed with the State Intellectual Property Office of the People's Republic of China on Jun. 1, 2020, and entitled "HEADWORD EXTRACTION METHOD AND APPARATUS, DEVICE, AND STORAGE MEDIUM", all of which are incorporated herein by reference in their entirety.

FIELD OF THE TECHNOLOGY

Embodiments of this application relate to the field of computer technologies, and in particular, to a headword extraction method and apparatus, a device, and a storage medium.

BACKGROUND OF THE DISCLOSURE

With the development of computer technologies and the wide application of search engines, users have higher and higher requirements for search accuracy. To improve the search accuracy, when searching according to a sentence inputted by a user, headwords that can accurately express semantics of the sentence are extracted from the sentence, and the search is carried out according to the headwords, so that a problem of fewer search results caused by searching according to the sentence is avoided.

SUMMARY

Embodiments of this application provide a headword extraction method, performed by a computer device, the method including:

obtaining a sentence feature of a target sentence and word features of a plurality of words in the target sentence;

extracting semantics of the sentence feature of the target sentence to obtain a semantic feature of the target sentence, the semantic feature of the target sentence being used for representing global semantics of the target sentence;

extracting semantics of the word feature of each word of the plurality of words to obtain a semantic feature of the word, the semantic feature of the word being used for representing local semantics of the word;

obtaining a respective matching degree between the semantic feature of each word of the plurality of words and the semantic feature of the target sentence; and determining, among the plurality of words in the target sentence, a word with a largest corresponding matching degree as a headword of the target sentence.

According to another aspect, a computer device is provided. The computer device includes a processor and a memory, the memory storing at least one instruction, the at least one instruction being loaded and executed by the processor to implement operations performed in the headword extraction method as described above.

According to another aspect, a non-transitory computer-readable storage medium is provided. The computer-readable storage medium stores at least one instruction, the at least one instruction being loaded and executed by a processor to implement operations performed in the headword extraction method as described above.

BRIEF DESCRIPTION OF THE DRAWINGS

The following briefly describes the accompanying drawings required for describing the embodiments. Apparently, the accompanying drawings in the following descriptions show merely some embodiments of the embodiments of this application, and a person of ordinary skill in the art may still derive other drawings from the accompanying drawings without creative efforts.

DESCRIPTION OF EMBODIMENTS

Figure 1:
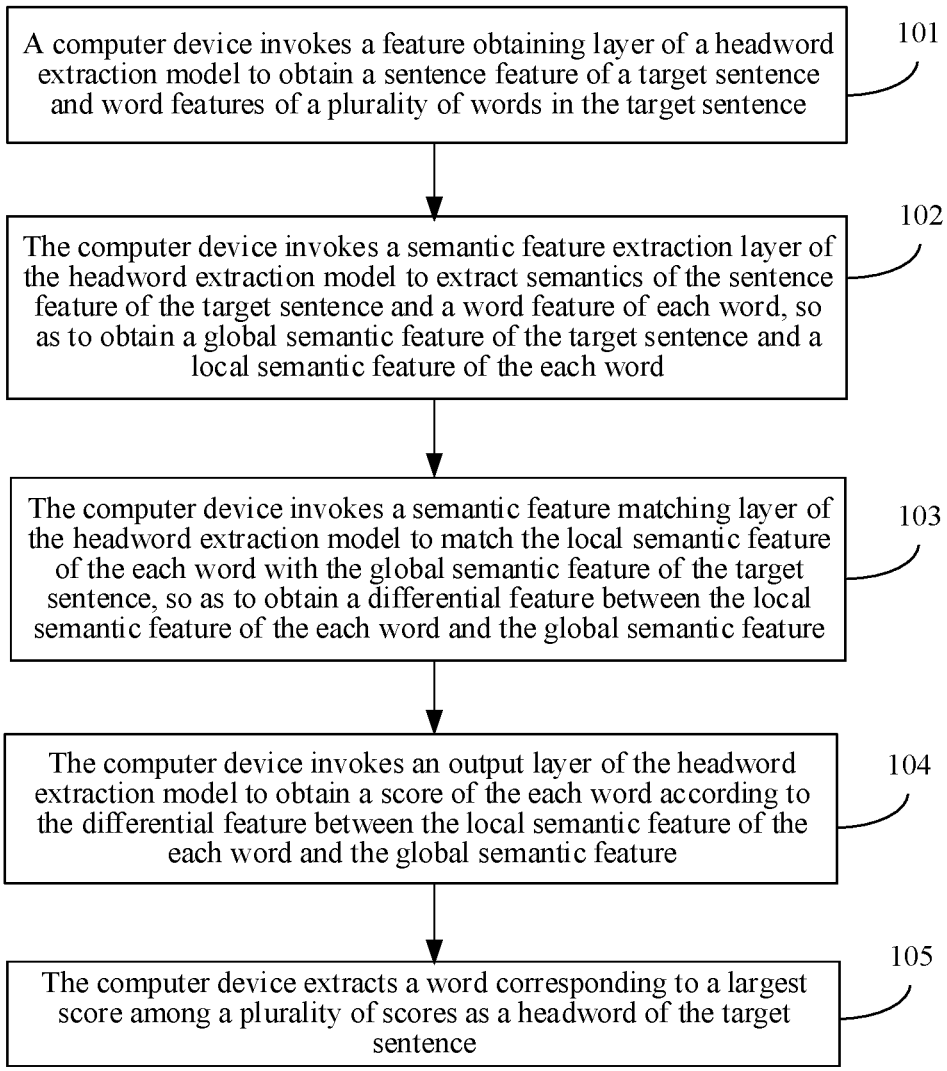
FIG. 1 is a flowchart of a headword extraction method according to an embodiment of this application.

To make objectives, technical solutions, and advantages of the embodiments of this application clearer, the following further describes in detail implementations of this application with reference to the accompanying drawings.

It is to be understood that, for terms such as "each", "a plurality of", and "any" used in this application, "a plurality of" refers to "two" or "more", "each" refers to "each of a plurality of corresponding", and "any" refers to "any one of a plurality of corresponding". For example, a plurality of words includes 10 words, and each word refers to each of the 10 words, and any word refers to any one of the 10 words.

Headword extraction: A headword of the sentence is identified and extracted according to a plurality of words in a sentence. A sentence includes one or more headwords, and the headword is a word in the sentence that accurately expresses semantics of the sentence and is essential to the core meaning of the sentence. For example, the headword is a word with a highest degree of relevance to the sentence, or the headword is a word with a degree of relevance to the sentence greater than a certain relevance threshold. In another example, the headword refers to a word that determines a grammatical category of the sentence, and is a central part of the sentence.

Term frequency-inverse document frequency (TF-IDF): TF-IDF is a commonly used weighting technology for information retrieval and data mining. Term frequency (TF) represents a frequency of a certain word appearing in a certain text. Inverse document frequency (IDF) represents a frequency of a certain word appearing in a plurality of texts.

Named entity recognition (NER): NER refers to recognition of an entity with specific meanings, for example, a word such as a person name, a place name, an institution name, and a proper noun in a text.

The headword extraction method provided by the embodiments of this application involves artificial intelligence technologies of artificial intelligence, natural language processing and other technologies. This application describes the headword extraction method through the following embodiments.

The embodiments of this application provide a headword extraction method, and an execution entity is a computer device. The computer device invokes a headword extraction model to obtain a sentence feature of a target sentence and word features of a plurality of words in the target sentence; extracts semantics of the sentence feature of the target sentence and a word feature of each word to obtain a global semantic feature of the target sentence and a local semantic feature of the word; matches the local semantic feature of the word with the global semantic feature of the target sentence to obtain a differential feature between the local semantic feature of the word and the global semantic feature; obtains a score of the word according to the differential feature between the local semantic feature of the word and the global semantic feature; and extracts a word corresponding to a largest score among a plurality of scores as a headword of the target sentence.

In another embodiment, the computer device obtains a sentence feature of a target sentence and word features of a plurality of words in the target sentence; extracts semantics of the sentence feature of the target sentence to obtain a semantic feature of the target sentence, and extracts semantics of a word feature of each word to obtain a semantic feature of the word; obtains a matching degree between the semantic feature of the word and the semantic feature of the target sentence, and determines, among the plurality of words, a word with a largest corresponding matching degree as a headword of the target sentence. The semantic feature of the target sentence is used for representing global semantics of the target sentence, and the semantic feature of the target sentence is a global semantic feature. The semantic feature of the word is used for representing local semantics of the word in the target sentence, and the semantic feature of the word is a local semantic feature. The matching degree corresponding to the word is used for representing a matching degree between the word and the target sentence, and the matching degree is the score.

In one implementation, the computer device is a terminal. The terminal may be of various types such as a portable terminal, a pocket terminal, or a hand-held terminal. For example, the terminal may be a smart phone, a tablet computer, a notebook computer, a desktop computer, a smart speaker, a smart watch, or the like.

In another implementation, the computer device is a server. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

In addition, the terminal and the server may be directly or indirectly connected in a wired or wireless communication manner, which is not limited in this application.

The headword extraction method provided by the embodiments of this application may be applied to a plurality of scenarios. For example, the method provided by the embodiments of this application may be applied to any scenario that needs to extract a headword from a sentence.

For example, the method is applied to a search scenario.

In the search scenario, the computer device obtains a sentence inputted by the user, adopts the headword extraction method provided by the embodiments of this application to extract a headword of the sentence, and searches according to the headword, so that a problem of fewer search results caused by searching according to the sentence is avoided. In addition, the search scenario may be various search scenarios such as an item search scenario or a news search scenario.

In another example, the method is applied to an item recommendation scenario.

In the item recommendation scenario, the computer device obtains a historical item in historical purchase records of the user, adopts the headword extraction method provided by the embodiments of this application to extract a headword of an item title corresponding to the historical item, searches an item corresponding to the item title including the headword according to the headword, and recommends the searched item to the user.

In another example, the method is applied to an item recognition scenario.

In the item recognition scenario, the computer device scans and recognizes a target item, searches a corresponding item image according to the scanned image obtained by scanning, determines a corresponding item title according to the searched item image, and adopts the headword extraction method provided by the embodiments of this application to extract a headword of the item title. Therefore, the target item is determined according to the headword, and an item name of the target item is obtained.

FIG. 1 is a flowchart of a headword extraction method according to an embodiment of this application. An execution entity of this embodiment of this application is a computer device. Referring to FIG. 1, the method includes:

101: A computer device invokes a feature obtaining layer of a headword extraction model to obtain a sentence feature of a target sentence and word features of a plurality of words in the target sentence.

In this embodiment of this application, the computer device obtains a target sentence from which a headword needs to be extracted, and invokes the headword extraction model to obtain a score of each word in the target sentence, so as to extract the headword of the target sentence according to the score of the word. That is, the computer device obtains a matching degree corresponding to the word in the target sentence, so as to extract the headword of the target sentence according to the matching degree corresponding to the word. This embodiment of this application only takes the target sentence as an example for description. A manner of extracting a headword of another sentence is similar to that of the target sentence. Details are not described in this embodiment of this application.

The target sentence is any sentence. For example, in the search scenario, the target sentence is a search sentence inputted by the user. In the item recognition scenario or the item recommendation scenario, the target sentence is an item title. In another scenario, the target sentence is a sentence in an article or another sentence.

The computer device adopts any word segmentation manner to perform word segmentation on a target sentence to obtain a plurality of words in the target sentence. For example, the word segmentation is performed according to part of speech, known words, or another manner, which is not limited in this embodiment of this application.

In this embodiment of this application, to facilitate subsequent processing on the target sentence and the plurality of words in the target sentence, the computer device converts the target sentence and the plurality of words in the target sentence into expression forms that can be recognized by the computer device, and invokes a feature extraction layer to obtain a sentence feature of the target sentence and a word feature of each word in the target sentence. The sentence feature and the word feature may be in a form of a feature sequence and a feature vector or be in another form.

102: The computer device invokes a semantic feature extraction layer of the headword extraction model to extract semantics of the sentence feature of the target sentence and a word feature of each word, so as to obtain a global semantic feature of the target sentence and a local semantic feature of the word.

In this embodiment of this application, the computer device obtains the sentence feature of the target sentence and word features of a plurality of words in the target sentence, extracts the semantics of the sentence feature of the target sentence to obtain a semantic feature of the target sentence, and extracts the semantics of the word feature of the word to obtain a semantic feature of the word. In some embodiments, the computer device performs the step of extracting the semantic feature of the target sentence and the step of extracting the semantic feature of the word sequentially or simultaneously.

The semantic feature extraction layer is configured to obtain the semantic feature of the target sentence according to the sentence feature of the target sentence, and obtain the semantic feature of the word according to the word feature of the word, so as to extract features that can express semantics of the sentence or the word. The semantic feature of the target sentence is used for representing semantics of the target sentence. The semantic feature of the word is used for representing semantics of the word. A semantic feature of a headword is a semantic feature closest to the semantic feature of the target sentence. That is, a matching degree between the semantic feature of the headword and the semantic feature of the target sentence is the largest.

In one implementation, the computer device adopts the same semantic extraction manner to extract a semantic feature of a target sentence and a semantic feature of each word.

In another implementation, because a target sentence and a plurality of words in the target sentence are different, the computer device adopts a different semantic extraction manner to extract a semantic feature of the target sentence and a semantic feature of each word. That is to say, a semantic extraction manner used for extracting the semantic feature of the target sentence may be different from a semantic extraction manner used for extracting the semantic feature of the word used by the computer device.

In addition, an expression form of the semantic feature of the target sentence is consistent with an expression form of the semantic feature of the word. For example, the semantic feature of the target sentence is in an expression form of a feature sequence, then the semantic feature of the word is also in an expression form of a feature sequence; and the semantic feature of the target sentence is in an expression form of a feature vector, then the semantic feature of the word is also in an expression form of a feature vector.

In this embodiment of this application, the computer device obtains the semantic feature of the target sentence and the semantic feature of the word, which can accurately understand the semantics of the word. For example, a word has different semantics in different sentences. If semantics of the word in a target sentence cannot be determined only according to a word feature of the word, then it cannot be determined whether the word is a headword of the target sentence. However, if a semantic feature of the word is obtained, the semantics of the word in the target sentence may be determined according to the semantic feature of the word, so as to determine whether the word is the headword of the target sentence.

103: The computer device invokes a semantic feature matching layer of the headword extraction model to match the local semantic feature of the word with the global semantic feature of the target sentence, so as to obtain a differential feature between the local semantic feature of the word and the global semantic feature.

The matching the local semantic feature of the word with the global semantic feature of the target sentence refers to matching the semantic feature of the word with the semantic feature of the target sentence. For example, the target sentence includes 3 words: a word 1, a word 2, and a word 3. The computer device matches a semantic feature of the word 1 with a semantic feature of the target sentence to obtain a differential feature 1 between the semantic feature of the word 1 and the semantic feature of the target sentence. Similarly, the computer device obtains a differential feature 2 between a semantic feature of the word 2 and the semantic feature of the target sentence, and a differential feature 3 between a semantic feature of the word 3 and the semantic feature of the target sentence.

In this embodiment of this application, a differential feature matching layer is configured to obtain a differential feature between the semantic feature of the word and the semantic feature of the target sentence. The differential feature is used for representing a matching degree between the target sentence and the word. The larger a difference represented by the differential feature, the smaller the matching degree between the target sentence and the word. The smaller the difference represented by the differential feature, the larger the matching degree between the target sentence and the word.

An expression form of the differential feature is consistent with an expression form of the semantic feature of the target sentence or the semantic feature of the word.

104: The computer device invokes an output layer of the headword extraction model to obtain a score of the word according to the differential feature between the local semantic feature of the word and the global semantic feature.

In this embodiment of this application, the output layer is configured to obtain the score of the word. That is, the computer device obtains the matching degree between the semantic feature of the word and the semantic feature of the target sentence. The score is negatively correlated with the differential feature. That is, the larger a difference between the semantic feature of the word and the semantic feature of the target sentence, the smaller the score and the smaller a probability that semantics of the word can reflect semantics of the target sentence; and the smaller the difference between the semantic feature of the word and the semantic feature of the target sentence, the larger the score and the larger the probability that the semantics of the word can reflect the semantics of the target sentence.

In step 103 and step 104 above, the computer device invokes the semantic feature matching layer and the output layer to obtain a matching degree between a semantic feature of each word in an input sentence and a semantic feature of the input sentence. The input sentence is the target sentence in this application.

105: The computer device extracts a word corresponding to a largest score among a plurality of scores as a headword of the target sentence.

In this embodiment of this application, the computer device extracts, according to the plurality of obtained scores, the word corresponding to the largest score among the plurality of scores as the headword of the target sentence. That is, the computer device determines, among a plurality of words, a word with a largest corresponding matching degree as the headword of the target sentence.

For example, for an item recognition scenario or an item recommendation scenario, with the development of search engine optimization (SEO), an item title of an item includes a plurality of words. The item title includes synonyms, such as running shoes, sports shoes, and skate shoes; further includes ambiguous words, such as brackets, elevated shelves, and frames; and further includes brand words.

In the related art, when a TF-IDF method is adopted to extract a headword from the item title, the method only counts words, and determines whether it is the headword according to a frequency of occurrence of a word. If a word appears frequently, but semantics of the word in the target sentence is different from that in other sentences, it is inaccurate to use the word as the headword of the target sentence. In addition, for synonyms, ambiguous words, and brand words, because the TF-IDF method cannot distinguish semantics of each word, the headword cannot be accurately extracted.

Alternatively, when an NER method is adopted to extract the headword from the item title, a headword extraction model used in this method can only extract a headword of a sentence from a plurality of words preset. If the headword of the sentence is not a preset word, then the NER method can only bluntly extract a headword from the plurality of words preset, resulting in inaccuracy of the extracted headword.

However, according to the method provided by this embodiment of this application, a feature obtaining layer of a headword extraction model is invoked to obtain a sentence feature of a target sentence and word features of a plurality of words in the target sentence, a semantic feature extraction layer is invoked to further extract the sentence feature and the word feature, and a semantic feature reflecting semantics of the target sentence and semantic features reflecting semantics of the plurality of words are extracted, a semantic feature matching layer is invoked to match a semantic feature of each word with the semantic feature of the target sentence, and a corresponding differential feature of the word is obtained on the basis of fully understanding the semantics of the plurality of words in the target sentence and the target sentence, the differential feature can reflect a matching degree between the semantic feature of the word and the semantic feature of the target sentence, and an output layer is invoked to obtain a score of the word according to the corresponding differential feature of the word, so that a word with a largest score is selected from the target sentence as a headword according to the score. In addition, the extraction method in this application is not limited to extracting a headword of a sentence from a plurality of known words. Therefore, the method has high expansibility, and accuracy of headword extraction is improved.

In addition, according to the method provided by this embodiment of this application, words such as synonyms, ambiguous words, and brand words in sentences can be accurately identified, and semantics of the sentences and a plurality of words in the sentences can be accurately understood, so that the accuracy of headword extraction is improved.

Figure 2:
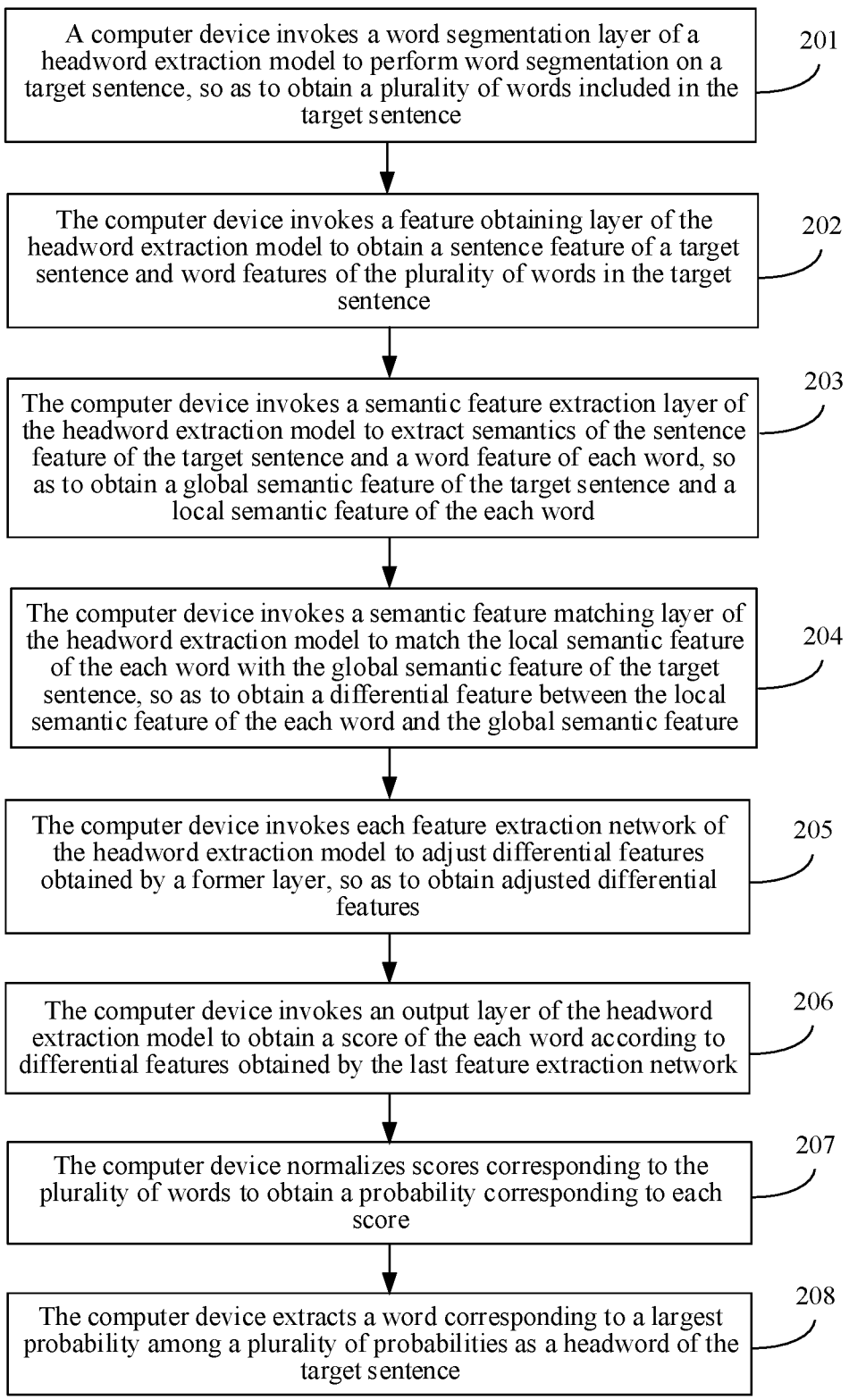
FIG. 2 is a flowchart of another headword extraction method according to an embodiment of this application.

FIG. 2 is a flowchart of another headword extraction method according to an embodiment of this application. An execution entity of this embodiment of this application is a computer device. Referring to FIG. 2, the method includes:

201: A computer device invokes a word segmentation layer of a headword extraction model to perform word segmentation on a target sentence, so as to obtain a plurality of words included in the target sentence.

In this embodiment of this application, the computer device obtains a target sentence of a headword to be extracted, inputs the target sentence into the headword extraction model, invokes the word segmentation layer of the headword extraction model to perform word segmentation on the target sentence, so as to obtain the plurality of words included in the target sentence. That is, the computer device performs word segmentation on the target sentence to obtain the plurality of words included in the target sentence.

The word segmentation layer includes a plurality of known words. The computer device performs word segmentation on the target sentence according to the plurality of known words. In addition, the computer device can modify the plurality of known words at any time, add new words to the word segmentation layer, or delete one or more words from the plurality of known words.

In one implementation, the word segmentation layer is a word segmenter based on a probability dictionary, that is, a word segmenter based on Jieba. The word segmenter includes an exact mode, a full mode, and a search engine mode. In the exact mode, the target sentence is segmented into a plurality of words according to a plurality of known words. In the full mode, all words that can be formed into words in the target sentence are segmented according to the plurality of known words to form a plurality of words. In the search engine mode, relatively long words are further segmented on the basis of the exact mode. This embodiment of this application adopts any mode to perform word segmentation on the target sentence, which is not limited in this embodiment of this application.

This embodiment of this application only takes the word segmentation layer as a word segmenter based on a probability dictionary as an example for description. In another embodiment, the word segmentation layer may alternatively be a word segmenter of another type. For example, the word segmentation layer is a statistical-based segmenter (such as a language model-based segmenter or a statistical machine learning-based segmenter), a neural network-based segmenter, or the like.

In one implementation, after obtaining a plurality of words included in a target sentence, the computer device determines a word identifier of each word. The word identifier is used for indicating a position of a corresponding word in the target sentence.

202: A computer device invokes a feature obtaining layer of a headword extraction model to obtain a sentence feature of a target sentence and word features of a plurality of words in the target sentence.

In one implementation, the computer device invokes a feature extraction layer of the headword extraction model to query a word feature corresponding to each word in the target sentence according to a mapping relationship. The mapping relationship includes a word and a corresponding word feature.

After obtaining the word feature of the word, the computer device combines the word features of the plurality of words according to an arrangement order of the plurality of words in the target sentence to obtain a sentence feature of the target sentence. That is, the computer device combines the plurality of word features obtained according to the arrangement order of the plurality of words in the target sentence, to obtain the sentence feature. For example, the target sentence includes three words. The arrangement order of the three words is a word 1, a word 2, and a word 3. According to the order of a word feature of the word 1, a word feature of the word 2, and a word feature of the word 3, word features of the three are combined to obtain a sentence feature.

In one implementation, the feature obtaining layer is an embedded encoder. The embedded encoder maps each input word to a corresponding word feature, and combines a plurality of words in a target sentence according to an arrangement order to obtain a sentence feature of the target sentence. The embedded encoder may use the Word2Vector algorithm or another algorithm. For example, a word feature of each word is a 200-dimensional feature sequence, and a target sentence includes n words, then a sentence feature of the target sentence is an n*200-dimensional feature sequence. The word feature above may alternatively be implemented as a 200-dimensional feature vector.

This embodiment of this application only takes the feature obtaining layer as an embedded encoder as an example for description. In another embodiment, the feature obtaining layer may alternatively obtain the sentence feature of the target sentence and the word feature of the word in another manner.

In some embodiments, the computer device deletes words and corresponding word features from the mapping relationship at any time, or adds words and corresponding word features to the mapping relationship at any time.

In addition, for other descriptions of step 202, refer to step 101 above. Details are not described herein gain.

203: The computer device invokes a semantic feature extraction layer of the headword extraction model to extract semantics of the sentence feature of the target sentence and a word feature of each word, so as to obtain a global semantic feature of the target sentence and a local semantic feature of the word.

In one implementation, the semantic feature extraction layer includes a word semantic extraction unit and a sentence semantic extraction unit. The computer device invokes the word semantic extraction unit of the semantic feature extraction layer to process the word feature of the word, so as to obtain a semantic feature of the word. The computer device invokes the sentence semantic extraction unit of the semantic feature extraction layer to process the sentence feature of the target sentence, so as to obtain a semantic feature of the target sentence. The word semantic extraction unit is configured to extract a word feature of each word. The sentence semantic extraction unit is configured to extract a sentence feature of a sentence.

The computer device obtains the word feature of the word in the target sentence, and inputs the plurality of word features to the word semantic extraction unit sequentially to obtain the semantic feature of the word sequentially. Alternatively, the computer device inputs the plurality of word features to the word semantic extraction unit simultaneously to obtain the semantic feature of the word.

The semantic feature of the word is obtained by the word semantic extraction unit. The semantic feature of the target sentence is extracted by the sentence semantic extraction unit. According to features of words and sentences, the extracted semantic features are more accurate. That is to say, in this embodiment of this application, the computer device extracts semantic features of words and sentences through different semantic extraction units respectively according to different features of the words and sentences, so that the accuracy of semantic feature extraction is improved.

Figure 3:
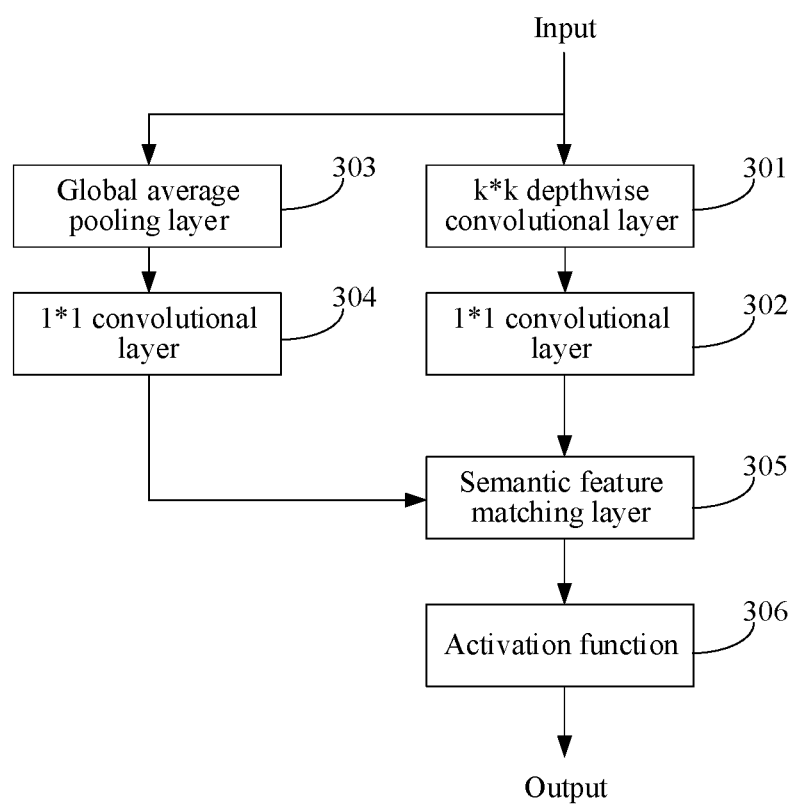
FIG. 3 is a schematic diagram of a semantic feature extraction layer and a semantic feature matching layer according to an embodiment of this application.

In one implementation, referring to a schematic diagram of a network structure shown in FIG. 3, the network structure is a network structure obtained by improving a residual convolutional neural network. The network structure includes a semantic feature extraction layer. The network structure includes a trunk path and a residual path. The trunk path is a word semantic extraction unit configured to extract semantics of a word feature of each word to obtain a semantic feature of the word. That is, the trunk path is configured to extract the semantic feature of the word in the target sentence. The residual path is a sentence semantic extraction unit configured to extract semantics of a sentence feature of the target sentence to obtain a semantic feature of the target sentence. That is, the residual path is configured to extract the semantic feature of the target sentence.

In some embodiments, the trunk path includes two 1*1 convolutional layers. Alternatively, the trunk path includes a k*k depthwise convolutional layer 301 and a 1*1 convolutional layer 302. k is a positive integer. Each convolutional layer is followed by a corresponding batch normalization (BN) layer. The depthwise convolutional layer can compress network parameters.

In some embodiments, the residual path includes a global average pooling layer 303 and a 1*1 convolutional layer 304. The global average pooling layer can effectively extract the semantic feature of the target sentence.

In addition, for other descriptions of step 203, refer to step 102 above. Details are not described herein gain.

204: The computer device invokes a semantic feature matching layer of the headword extraction model to match the local semantic feature of the word with the global semantic feature of the target sentence, so as to obtain a differential feature between the local semantic feature of the word and the global semantic feature.

In this embodiment of this application, the computer device matches a semantic feature of the word with a semantic feature of the target sentence to obtain a differential semantic feature corresponding to the word. The differential semantic feature is the differential feature. The differential feature between the semantic feature of the word and the semantic feature of the target sentence is the differential semantic feature corresponding to the word.

In one implementation, the computer device invokes a semantic feature matching layer of the headword extraction model, and adds the semantic feature of the word and the semantic feature of the target sentence to obtain the differential feature between the semantic feature of the word and the semantic feature of the target sentence. Alternatively, the computer device invokes a semantic feature matching layer of the headword extraction model, and subtracts the semantic feature of the word from the semantic feature of the target sentence to obtain the differential feature between the semantic feature of the word and the semantic feature of the target sentence. The processing of addition or subtraction is to match the semantic feature of the word with the semantic feature of the target sentence to obtain the differential feature between the semantic feature of the word and the semantic feature of the target sentence.

That is, the computer device subtracts the semantic feature of the word from the semantic feature of the target sentence to obtain the differential semantic feature corresponding to the word. Alternatively, the computer device adds the semantic feature of the word and the semantic feature of the target sentence to obtain a fused semantic feature corresponding to the word. The fused semantic feature is the differential feature. Subsequently, the fused semantic feature is further segmented to obtain a difference between the semantic feature of the word and the semantic feature of the target sentence.

When the computer device invokes the semantic feature matching layer, and adds the semantic feature of the word and the semantic feature of the target sentence to obtain the fused semantic feature corresponding to the word, the fused semantic feature includes both the semantic feature of the word and the semantic feature of the target sentence, which can indirectly indicate the difference between the semantic feature of the word and the semantic feature of the target sentence, that is, indirectly reflect a matching degree between the semantic feature of the word and the semantic feature of the target sentence. An output layer of the headword extraction model can subsequently obtain a matching degree corresponding to the word through the difference indirectly indicated by the fused semantic feature. That is, the output layer is invoked to process the fused semantic feature. First, the fused semantic feature is segmented to obtain the semantic feature of the word and the semantic feature of the target sentence included in the fused semantic feature. Then, the difference between the semantic feature of the word and the semantic feature of the target sentence is determined, and the matching degree is determined according to the determined difference.

When the computer device invokes the semantic feature matching layer, and subtracts the semantic feature of the word from the semantic feature of the target sentence to obtain the differential semantic feature corresponding to the word, the differential semantic feature can directly indicate the difference between the semantic feature of the word and the semantic feature of the target sentence, that is, directly reflect the matching degree between the semantic feature of the word and the semantic feature of the target sentence. An output layer of the headword extraction model subsequently obtains the matching degree corresponding to the word through the difference directly indicated by the differential semantic feature. That is, the output layer is invoked to process the differential semantic feature to directly obtain the matching degree.

In one implementation, based on the possible implementation in step 203 above, referring to FIG. 3, the network structure further includes a semantic feature matching layer 305. After the semantic feature matching layer, an activation function 306 is further included, and a final output differential feature is obtained by inputting each differential feature obtained by the semantic feature matching layer into the activation function. The activation function is a Rectified linear unit (ReLU), Swish, Gaussian error linear units (GELU) or another activation function.

In addition, for other descriptions of step 204, refer to step 103 above. Details are not described herein gain.

205: The computer device invokes each feature extraction network of the headword extraction model to adjust differential features obtained by a former layer, so as to obtain adjusted differential features.

In this embodiment of this application, the computer device adjusts a differential semantic feature corresponding to each word to obtain an adjusted differential semantic feature, and then obtains a matching degree corresponding to the word according to the adjusted differential semantic feature corresponding to the word. Alternatively, the computer device adjusts a fused semantic feature corresponding to the word to obtain an adjusted fused semantic feature, and then obtains the matching degree corresponding to the word according to the adjusted fused semantic feature corresponding to the word.

The headword extraction model further includes at least one feature extraction network. The feature extraction network is configured to adjust the obtained differential semantic feature to obtain a more accurate differential semantic feature. A structure of the feature extraction network is similar to the network structure shown in FIG. 3. That is, the network structure of the feature extraction network is the same as the network structure shown in FIG. 3 (network parameters may be different), or the network structure of the feature extraction network is different from the network structure shown in FIG. 3.

Network layers in the headword extraction model have a connection relationship. Among two network layers with a connection relationship, an output of the former network layer is an input of the latter network layer. For example, for the first feature extraction network in a plurality of feature extraction networks, the former layer is a semantic feature matching layer. For a feature extraction network other than the first feature extraction network in the plurality of feature extraction networks, the former layer is a network layer in a former feature extraction network that has a connection relationship with the feature extraction network.

In one implementation, the feature extraction network includes a semantic feature extraction layer and a semantic feature matching layer. When adjusting the differential feature obtained by the former layer, the computer device invokes the semantic feature extraction layer of the feature extraction network to extract semantics of the differential feature between the semantic feature of the word and the semantic feature of the target sentence obtained by the former layer, so as to obtain an adjusted semantic feature of the target sentence and an adjusted semantic feature of the word; and invokes the semantic feature matching layer of the feature extraction network to match the adjusted semantic feature of the word with the adjusted semantic feature of the target sentence, so as to obtain an adjusted differential feature.

That is, when adjusting a differential semantic feature obtained by the former layer, the computer device invokes the semantic feature extraction layer of the feature extraction network to extract semantics of the differential semantic feature between the semantic feature of the word and the semantic feature of the target sentence obtained by the former layer, so as to obtain an adjusted semantic feature of the target sentence and an adjusted semantic feature of the word; and invokes the semantic feature matching layer of the feature extraction network to match the adjusted semantic feature of the word with the adjusted semantic feature of the target sentence, so as to obtain an adjusted differential semantic feature. Alternatively, when adjusting a fused semantic feature obtained by the former layer, the computer device invokes the semantic feature extraction layer of the feature extraction network to extract semantics of the fused semantic feature between the semantic feature of the word and the semantic feature of the target sentence obtained by the former layer, so as to obtain an adjusted semantic feature of the target sentence and an adjusted semantic feature of the word; and invokes the semantic feature matching layer of the feature extraction network to match the adjusted semantic feature of the word with the adjusted semantic feature of the target sentence, so as to obtain an adjusted fused semantic feature.

In some embodiments, when the differential feature is the differential semantic feature, because the differential semantic feature between the semantic feature of the word and the semantic feature of the target sentence includes semantic features of words other than the word, then for a plurality of words, the semantic feature of the word can be extracted from differential semantic features corresponding to the plurality of words, and the semantic feature of the word is further extracted through the semantic feature extraction layer, so that the adjusted semantic feature of the word can be obtained. For the target sentence, the differential semantic features corresponding to the plurality of words are fused to obtain the semantic feature of the target sentence, and the semantic feature of the target sentence is further extracted through the semantic feature extraction layer, so that the adjusted semantic feature of the target sentence can be obtained.

A structure of the semantic feature extraction layer of the feature extraction network is similar to the structure of the semantic feature extraction layer of the headword extraction model in step 203 above, and an implementation of the semantic feature extraction is similar to the implementation in step 203 above. A structure of the semantic feature matching layer of the feature extraction network is similar to the structure of the semantic feature matching layer of the headword extraction model in step 204 above, and an implementation of the semantic feature matching is similar to the implementation in step 204 above. Details are not described herein again.

In one implementation, the differential feature is a fused semantic feature. The headword extraction model includes a plurality of feature extraction networks. Any feature extraction network obtains fused semantic features obtained by a former layer and further adjusts the fused semantic features obtained by the former layer. The computer device extracts a semantic feature of each word from a fused semantic feature corresponding to the word, and fuses the extracted semantic feature of the word to obtain an adjusted semantic feature of the target sentence. The fused semantic feature corresponding to the word is further extracted through the feature extraction network. Then, a manner similar to that of the semantic feature matching layer is adopted to match the adjusted semantic feature of the target sentence with the fused semantic feature corresponding to the word after semantic extraction to obtain the adjusted fused semantic feature.

Figure 4:
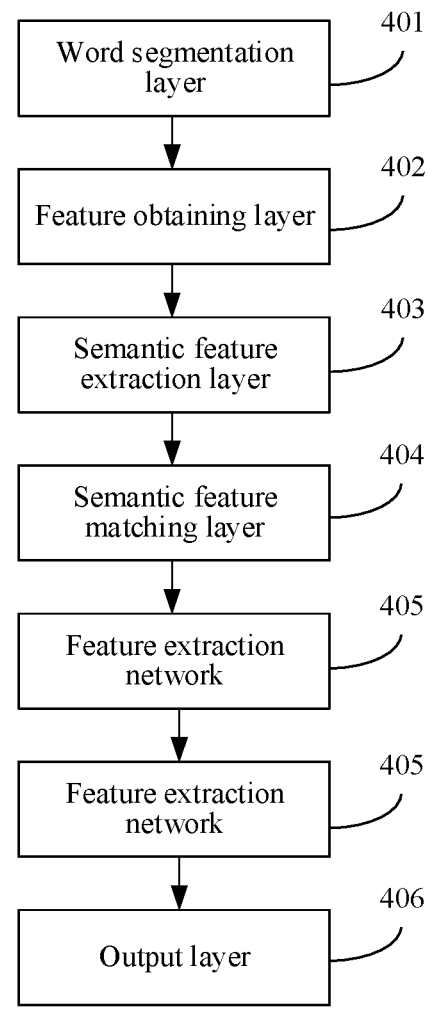
FIG. 4 is a schematic diagram of a headword extraction model according to an embodiment of this application.

In one implementation, referring to a schematic diagram of a headword extraction model shown in FIG. 4, the headword extraction model includes a word segmentation layer 401, a feature obtaining layer 402, a semantic feature extraction layer 403, a semantic feature matching layer 404, two feature extraction networks 405, and an output layer 406.

In this embodiment of this application, after the semantic feature matching layer, a plurality of feature extraction networks are set. The plurality of feature extraction networks further extract semantics of differential features, so that the multi-level extraction of semantic features is implemented, and the accuracy of the obtained semantic features is improved. Therefore, the accuracy of the differential features is improved, and the extraction accuracy of the headword is further improved.

Figure 5:
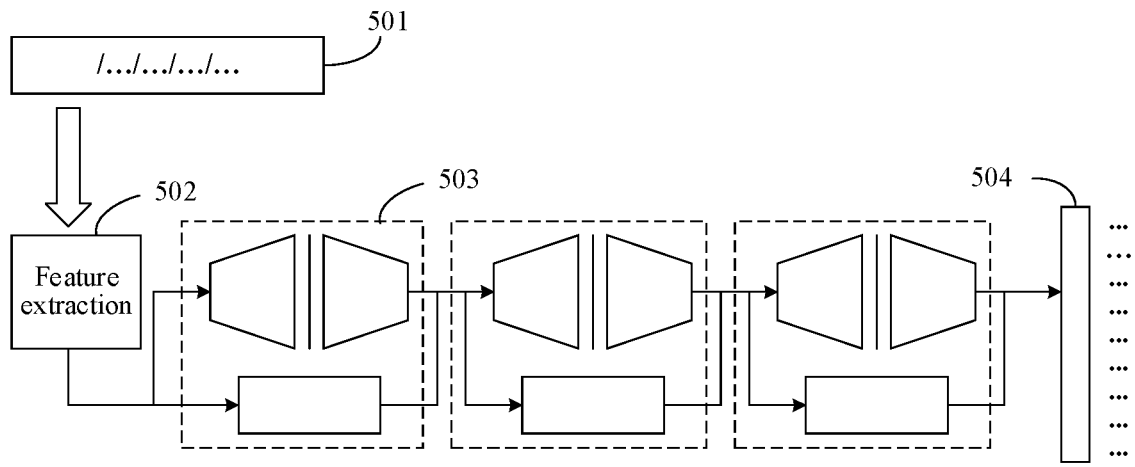
FIG. 5 is a schematic diagram of a headword extraction model according to an embodiment of this application.

When a structure of the semantic feature extraction layer 403 of the headword extraction model in FIG. 4 is similar to the structure of the semantic feature extraction layer in the feature extraction network 405, and a structure of the semantic feature matching layer 404 is similar to the structure of the semantic feature matching layer in the feature extraction network 405, the semantic feature extraction layer 403 and the semantic feature matching layer 404 may form a basic structural unit similar to the feature extraction network 405. Referring to a schematic diagram of a headword extraction model shown in FIG. 5, the headword extraction model includes a word segmentation layer 501, a feature obtaining layer 502, three basic structural units 503, and an output layer 504. Network structures of the three basic structural units 503 are similar to the network structure shown in FIG. 3.

This embodiment of this application only takes the network structure of the feature extraction network as similar to the network structures of the semantic feature extraction layer and the semantic feature matching layer of the headword extraction model as an example for description. In another embodiment, the network structure of the feature extraction network may be in another form, and this embodiment of this application does not limit the network structure of the feature extraction network.

206: The computer device invokes an output layer of the headword extraction model to obtain a score of the word according to differential features obtained by the last feature extraction network.

The last feature extraction network is the last invoked feature extraction network in the plurality of feature extraction networks. For example, taking two feature extraction networks shown in FIG. 4 as an example, the two feature extraction networks have a connection relationship. The last feature extraction network refers to the latter feature extraction network in the two feature extraction networks having a connection relationship.

The computer device invokes the output layer. The output layer obtains the score of the word according to the differential features obtained by the last feature extraction layer. The score is used for reflecting a matching degree between the word and the target sentence. The output layer includes a 1*1 convolutional layer. That is, the computer device obtains the matching degree corresponding to the word according to the adjusted differential features.

207: The computer device normalizes the scores corresponding to the plurality of words to obtain a probability corresponding to each score.

208: The computer device extracts a word corresponding to a largest probability of the plurality of probabilities as a headword of the target sentence.

In this embodiment of this application, after obtaining the matching degree corresponding to the word, the computer device normalizes the matching degrees corresponding to the plurality of words to obtain a probability corresponding to each matching degree. A sum of the probabilities corresponding to the plurality of words after the normalization process is 1. The probability is used for representing a probability that a corresponding word is the headword of the target sentence. A word corresponding to a largest probability is extracted as the headword of the target sentence. The larger the probability of the word, the larger the probability that the word is the headword, and the smaller the probability of the word, the smaller the probability that the word is the headword.

In one implementation, the computer device uses the softmax function to perform the normalization operation. Alternatively, the computer device normalizes the scores corresponding to the plurality of words by adopting a method of a weighted average or a weighted sum.

For example, the target sentence is "wo jin tian he peng you yi qi qu pa shan le". The target sentence includes words: "wo", "jin tian", "he", "peng you", "yi qi qu", "pa shan", and "le". The emphasis in this sentence is on "pa shan". The headword of the target sentence is extracted by adopting the foregoing implementation. Matching degrees corresponding to "wo", "jin tian", "he", "peng you", "yi qi qu", "pa shan", and "le" are obtained. The matching degrees are "20, 10, 5, 20, 3, 80, and 1". The matching degree corresponding to "pa shan" is the largest, then "pa shan" is extracted from the target sentence and used as the headword of the target sentence "wo jin tian he peng you yi qi qu pa shan le".

According to the method provided by this embodiment of this application, the semantic feature extraction layer is invoked to further extract the obtained sentence feature and word feature, and the semantic feature reflecting the semantics of the target sentence and the semantic feature reflecting the semantics of the word are extracted, the semantic feature matching layer is invoked to match the semantic feature of the word with the semantic feature of the target sentence, and the differential feature corresponding to the word is obtained on the basis of fully understanding the semantics of the words in the target sentence and the target sentence, the differential feature can reflect the matching degree between the semantic feature of the word and the semantic feature of the target sentence, and the output layer is invoked to obtain the score of the word according to the corresponding differential feature of the word, so that the word with the largest score is selected from the target sentence as the headword according to the score. In addition, the extraction method in this application is not limited to extracting a headword of a sentence from a plurality of known words. Therefore, the method has high expansibility, and the accuracy of headword extraction is improved.

Moreover, according to the method provided by this embodiment of this application, because a plurality of known words in the word segmentation layer and words in the mapping relationship in the feature obtaining layer can be modified at any time, then the headword extraction model can accurately obtain a word feature of any word. Therefore, the headword extraction model can accurately extract the headword in the target sentence, and the expansibility of the headword extraction is improved.

In addition, according to the method provided by this embodiment of this application, after the semantic feature matching layer, a plurality of feature extraction networks are set. The plurality of feature extraction networks further extract semantics of differential features, so that the multi-level semantic feature extraction is implemented, and the accuracy of the obtained semantic features is improved. Therefore, the accuracy of the differential features is improved, and the extraction accuracy of the headword is further improved.

Moreover, according to the method provided by this embodiment of this application, due to features of the network structure, the improved residual neural network can quickly process the word features or sentence features, thereby improving the efficiency of headword extraction.

For example, comparing an item title including a plurality of words, it takes less than 1 ms to extract a headword in the item title.

Before being invoked, the headword extraction model needs to be trained first. For details of the training process, refer to the following embodiment.

Figure 6:
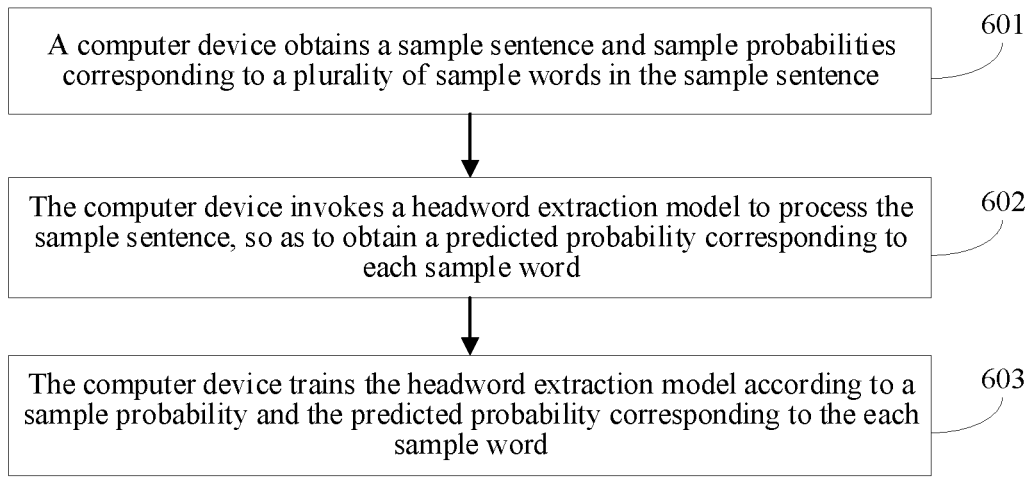
FIG. 6 is a flowchart of a model training method according to an embodiment of this application.

FIG. 6 is a flowchart of a model training method according to an embodiment of this application. An execution entity of this embodiment of this application is a computer device. Referring to FIG. 6, the method includes:

601: A computer device obtains a sample sentence and sample probabilities corresponding to a plurality of sample words in the sample sentence.

The sample sentence is any sentence. A sample probability corresponding to a sample word is used for representing a probability that a corresponding sample word is a headword of the sample sentence. Obtaining the sample probabilities corresponding to the plurality of sample words is to obtain a sample probability corresponding to each sample word. For example, a sample probability of a headword of a sample sentence is 1, and sample probabilities of words other than the headword are 0.

In addition, word segmentation is performed on the sample sentence in a manner consistent with a word segmentation manner in the headword extraction model, to obtain a plurality of sample words in the sample sentence, so that the inconsistency between the plurality of sample words set and the plurality of sample words obtained by invoking the headword extraction model is avoided. For example, the computer device first performs word segmentation on the sample sentence through the word segmentation layer in the headword extraction model, and outputs a word segmentation result. The word segmentation result includes the plurality of sample words. Then, the computer device sets, according to a headword labeled by a developer, the sample probabilities corresponding to the respective sample words.

602: The computer device invokes a headword extraction model to process the sample sentence, so as to obtain a predicted probability corresponding to each sample word.

In one implementation, the computer device invokes the headword extraction model to process the sample sentence, so as to obtain a predicted score corresponding to the sample word; and normalizes predicted scores corresponding to the plurality of sample words to obtain the predicted probability corresponding to the sample word, so that a sum of predicted probabilities corresponding to the plurality of sample words is 1. That is, the computer device invokes the headword extraction model to process the sample sentence to obtain a predicted matching degree corresponding to each word, and normalizes predicted matching degrees corresponding to the plurality of sample words to obtain the predicted probability corresponding to the sample word, so that the sum of the predicted probabilities corresponding to the plurality of sample words is 1.

For example, normalization is performed by using the following formula:

$$p_i = x_i / \sum_{i=1}^{j} x_i;$$

where x represents a predicted score outputted by a headword extraction model, p represents a predicted probability after normalization, i represents the order of sample words in a sample sentence, j represents that the sample sentence includes j sample words in total, i and j are positive integers, i is not greater than j, $x_i$ represents a predicted score of an $i^{th}$ sample word in the sample sentence, and $p_i$ represents a predicted probability of the $i^{th}$ sample word in the sample sentence.

In some embodiments, a corresponding sample word identifier is set for each sample word in the sample sentence to indicate a position of the sample word in the sample sentence.

In this embodiment of this application, a process that the computer device invokes the headword extraction model to process the sample sentence, so as to obtain the predicted probability corresponding to the sample word is similar to the process of obtaining probabilities corresponding to the plurality of words in the target sentence in the embodiment shown in FIG. 2 above (corresponding to step 201 to step 207 above). Details are not described herein again.

603: The computer device trains the headword extraction model according to a sample probability and the predicted probability corresponding to the sample word.

In one implementation, the computer device obtains a product of the sample probability and a logarithm of the predicted probability corresponding to the sample word; uses a sum of products corresponding to the plurality of sample words as a loss value corresponding to the sample sentence; and trains the headword extraction model according to the loss value.

For example, the loss value corresponding to the sample sentence is determined by using the following cross-entropy loss:

$$L = y_m \log(p_m) + (1 - y_m)\log(1 - p_m);$$

where L represents a loss value, m represents the order of headwords in a sample sentence, $y_m$ is a sample probability of a headword, and $p_m$ is a predicted probability of the headword.

In one implementation, after obtaining the loss value, the computer device adjusts model parameters of the headword extraction model according to the loss value, so that the loss value of the adjusted headword extraction model is reduced until the loss value gradually decreases to a minimum value, and the training of the headword extraction model is thereby completed. The minimum value is 0.

This embodiment of this application only takes the loss function as the cross-entropy as an example for description. In another embodiment, another loss function may be alternatively used for determining the loss value.

This embodiment of this application only takes the training manner based on list sorting above as an example for description. In another embodiment, the computer device may alternatively adopt another training manner to train the headword extraction model. For example, according to a difference between a sample probability and a predicted probability of each word, parameters of the headword extraction model are adjusted, so that the difference between the sample probability and the predicted probability is gradually reduced to a minimum value.

According to the method provided by this embodiment of this application, the sample sentence and the sample probabilities corresponding to the plurality of sample words in the sample sentence are obtained, the headword extraction model is invoked to process the sample sentence, so as to obtain the predicted probability corresponding to the sample word, and the headword extraction model is trained according to the sample probability and the predicted probability corresponding to the sample word. This embodiment of this application provides a training method for a headword extraction model. According to the method, the headword extraction model is trained according to the predicted probability and the sample probability, thereby improving the accuracy of the headword extraction model.

In addition, in this embodiment of this application, in the process of training the headword extraction model, sample probabilities of a plurality of sample words in the sample sentence are set, and there is no need to consider which word is selected as a negative sample. Therefore, a problem of selecting a negative sample is avoided, and the difficulty of model training is reduced.

The computer device invoking the headword extraction model and extracting the headword from the target sentence in the embodiment shown in FIG. 2 above and the computer device training the headword extraction model in the embodiment shown in FIG. 6 are the same or different.

For example, the computer device in the embodiment shown in FIG. 2 is a server or a terminal of a user, and the computer device in the embodiment shown in FIG. 6 is a terminal or server of a developer. Alternatively, the computer device in the embodiment shown in FIG. 2 and the computer device in the embodiment shown in FIG. 6 are the same server.

Figure 7:
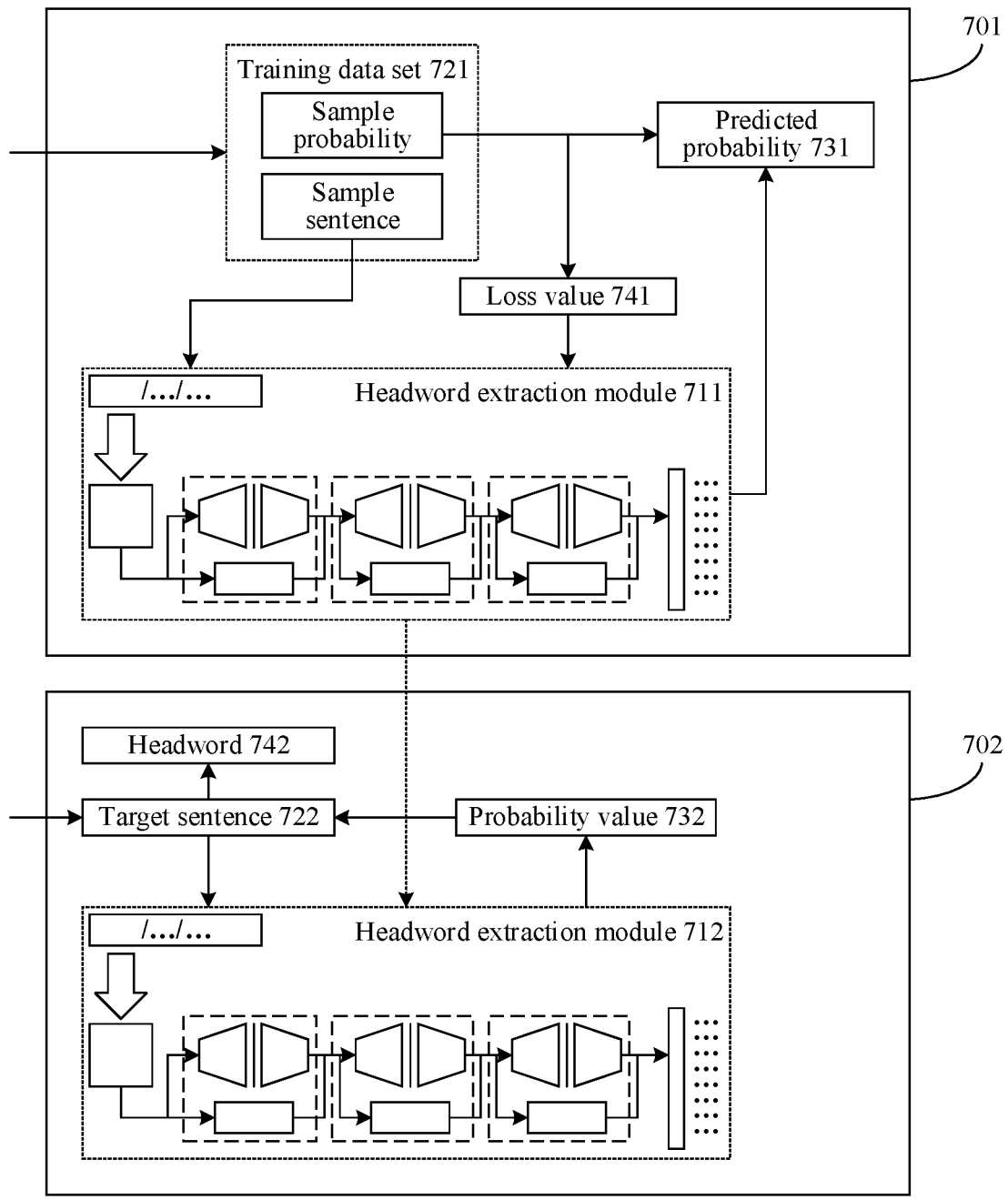
FIG. 7 is a schematic diagram of a training and application framework of a headword extraction model according to an embodiment of this application.

Taking the computer device in the embodiment shown in FIG. 2 as a server and the computer device in the embodiment shown in FIG. 6 as a terminal of a developer as an example, FIG. 7 is a schematic diagram of a training and application framework of a headword extraction model according to an embodiment of this application.

As shown in FIG. 7, in a training stage, the developer deploys a headword extraction module 711 to be trained in a terminal 701, and sets a training data set 7021. The training data set 7021 includes sample sentences, and a pre-labeled sample probability corresponding to each sample word in the sample sentence. The terminal 701 invokes the headword extraction module 711 to process the sample sentences in the training data set 7021, so as to obtain a predicted probability 731 corresponding to the sample word; then calculates a loss value 741 based on the predicted probability 731 and the sample probability in the training data set 7021, and trains the headword extraction module 711 according to the loss value 741. The process is repeated until the headword extraction module 711 converges, a trained headword extraction module 712 is obtained, and the headword extraction module 712 can be deployed in a server 702.

The above server 702 is a server corresponding to a search engine in a search scenario, or a server corresponding to an application program with an item recommendation or item recognition function in an item recommendation scenario or an item recognition scenario.

In an application stage, the above server 702 can receive/obtain a target sentence 722, input the target sentence 722 into the headword extraction module 712, process the target sentence 722 through the headword extraction module 712, and output a probability value 732 corresponding to each word in the target sentence 722. Then, the above server 702 can determine a headword 742 in the target sentence based on the probability value 732 corresponding to the word, and perform subsequent applications based on the headword 742, for example, search, item recommendation, or item recognition based on the headword 742.

The embodiments shown in FIG. 1 and FIG. 2 above only take the headword extraction model invoked to extract the headword as an example for description. In another embodiment, the computer device may not invoke the headword extraction model to extract the headword. A process of extracting the headword without invoking the headword extraction model is described in detail through the embodiment shown in FIG. 8 below.

Figure 8:
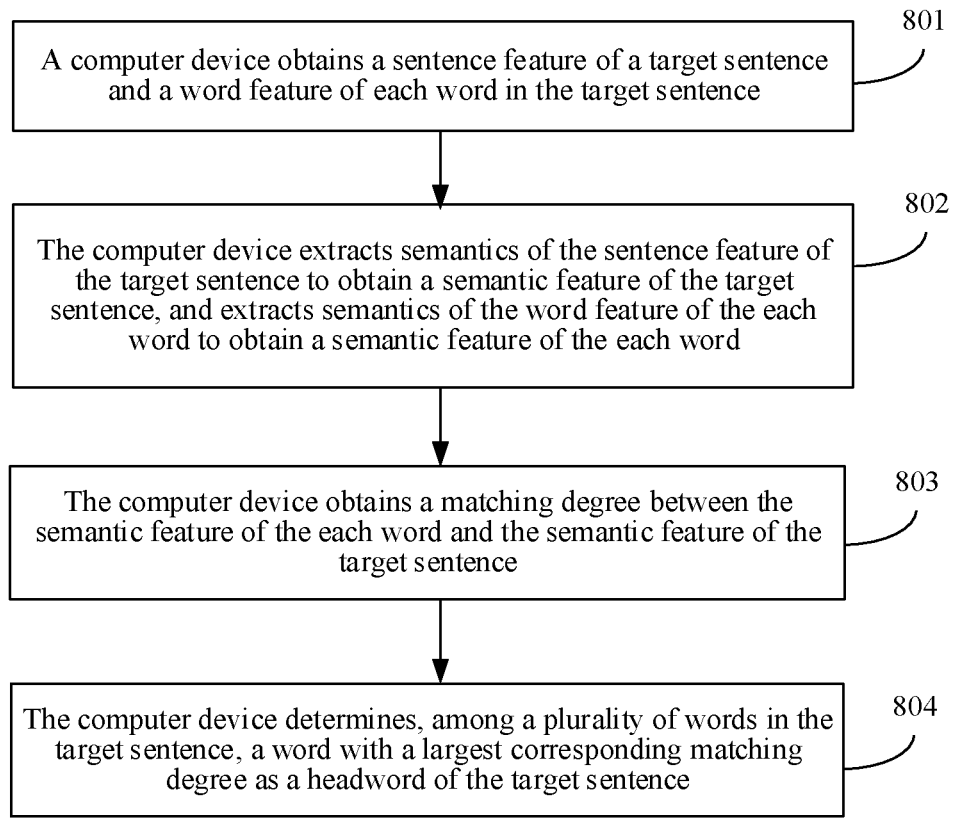
FIG. 8 is a flowchart of a headword extraction method according to an embodiment of this application.

FIG. 8 is a flowchart of a headword extraction method according to an embodiment of this application. An execution entity of this method is a computer device. Referring to FIG. 8, the method includes:

801: A computer device obtains a sentence feature of a target sentence and a word feature of each word of a plurality of words in the target sentence.

802: The computer device extracts semantics of the sentence feature of the target sentence to obtain a semantic feature of the target sentence, and extracts semantics of the word feature of each word to obtain a semantic feature of the word.

803: The computer device obtains a respective matching degree between the semantic feature of each word and the semantic feature of the target sentence.

In one implementation, the computer device matches the semantic feature of the word with the semantic feature of the target sentence to obtain a differential semantic feature corresponding to the word; and determines a matching degree corresponding to the word according to the differential semantic feature corresponding to the word. In some embodiments, the computer device subtracts the semantic feature of the word from the semantic feature of the target sentence to obtain the differential semantic feature corresponding to the word.

In some embodiments, the computer device adjusts the differential semantic feature corresponding to the word to obtain an adjusted differential semantic feature; and obtains the matching degree corresponding to the word according to the adjusted differential semantic feature corresponding to the word.

In another implementation, the computer device adds the semantic feature of the word and the semantic feature of the target sentence to obtain a fused semantic feature corresponding to the word; and determines the matching degree corresponding to the word according to the fused semantic feature corresponding to the word.

In some embodiments, the computer device adjusts the fused semantic feature corresponding to the word to obtain an adjusted fused semantic feature; and obtains the matching degree corresponding to the word according to the adjusted fused semantic feature corresponding to the word.

804: The computer device determines, among the plurality of words in the target sentence, a word with a largest corresponding matching degree as a headword of the target sentence.

In one implementation, after obtaining the matching degree corresponding to the word, the computer device normalizes matching degrees corresponding to a plurality of words to obtain a probability corresponding to each matching degree, so that a sum of probabilities corresponding to the plurality of words is 1, and determines a word corresponding to the largest probability of the plurality of probabilities as the headword of the target sentence.

According to the method provided in this embodiment of this application, by extracting the semantics of the sentence feature of the extracted target sentence and the word feature of the word, the semantic feature reflecting the semantics of the target sentence and the semantic features reflecting the semantics of the words are obtained. On the basis of fully understanding the semantics of the target sentence and the words in the target sentence, the obtained matching degree between the semantic feature of the word and the semantic feature of the target sentence can accurately indicate whether a word matches the target sentence. Therefore, according to the matching degree, the word with the largest corresponding matching degree is selected from the target sentence as the headword, and the accuracy of headword extraction is improved.

Figure 9:
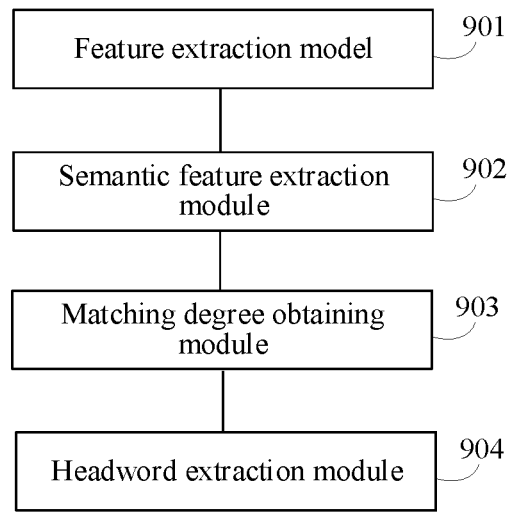
FIG. 9 is a schematic structural diagram of a headword extraction apparatus according to an embodiment of this application.

FIG. 9 is a schematic structural diagram of a headword extraction apparatus according to an embodiment of this application. Referring to FIG. 9, the apparatus includes:

a feature obtaining module 901, configured to obtain a sentence feature of a target sentence and a word feature of each word in the target sentence;

a semantic feature extraction module 902, configured to extract semantics of the sentence feature of the target sentence to obtain a semantic feature of the target sentence, and extract semantics of the word feature of the word to obtain a semantic feature of the word, the semantic feature of the target sentence being used for representing global semantics of the target sentence, and the semantic feature of the word being used for representing local semantics of the word;

a matching degree obtaining module 903, configured to obtain a matching degree between the semantic feature of the word and the semantic feature of the target sentence; and a headword extraction module 904, configured to determine, among a plurality of words in the target sentence, a word with a largest corresponding matching degree as a headword of the target sentence.

According to the apparatus provided in this embodiment of this application, by extracting the semantics of the sentence feature of the extracted target sentence and the word feature of the word, the semantic feature reflecting the semantics of the target sentence and the semantic features reflecting the semantics of the words are obtained. On the basis of fully understanding the semantics of the target sentence and the words in the target sentence, the obtained matching degree between the semantic feature of the word and the semantic feature of the target sentence can accurately indicate a matching degree between a word and the target sentence. Therefore, according to the matching degree, the word with the largest corresponding matching degree is selected from the target sentence as the headword, and the accuracy of headword extraction is improved.

Figure 10:
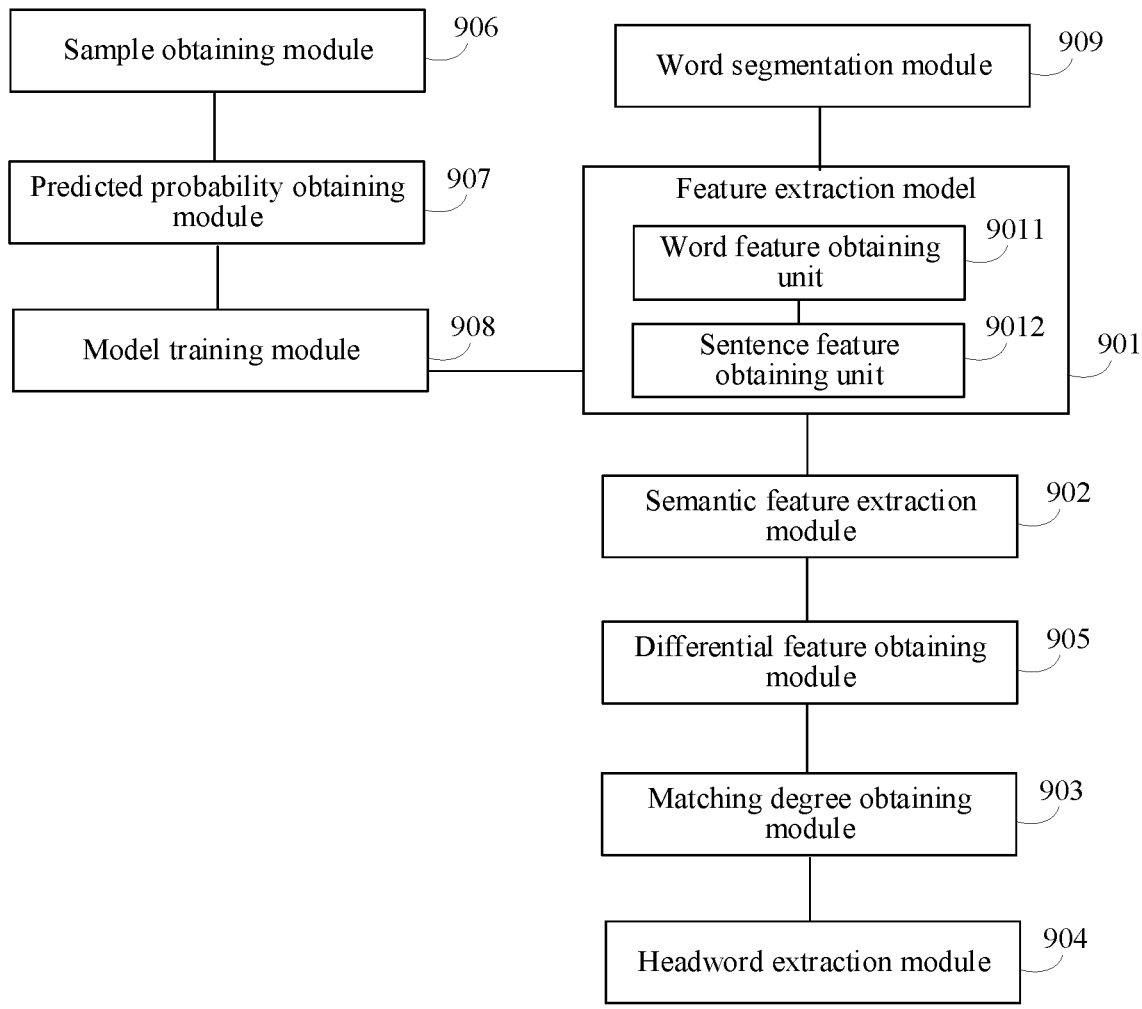
FIG. 10 is a schematic structural diagram of another headword extraction apparatus according to an embodiment of this application.

In another implementation, referring to FIG. 10, the apparatus further includes:

a differential feature obtaining module 905, configured to subtract the semantic feature of the word from the semantic feature of the target sentence to obtain a differential semantic feature corresponding to the word; and a matching degree obtaining module 903, configured to determine a matching degree corresponding to the word according to the differential semantic feature corresponding to the word.

In another implementation, the matching degree obtaining module 903 is further configured to:

add the semantic feature of the word and the semantic feature of the target sentence to obtain a fused semantic feature corresponding to the word; and determine the matching degree corresponding to the word according to the fused semantic feature corresponding to the word.

In another implementation, referring to FIG. 10, the apparatus further includes:

a differential feature adjustment module 95, configured to adjust the differential semantic feature corresponding to the word to obtain an adjusted differential semantic feature; and the matching degree obtaining module 903, further configured to obtain the matching degree corresponding to the word according to the adjusted differential semantic feature corresponding to the word.

In another implementation, the feature obtaining module 901 includes:
a word feature obtaining unit 9011, configured to query the word feature of the word according to a mapping relationship, the mapping relationship including a word and a corresponding word feature; and
a sentence feature obtaining unit 9012, configured to combine a plurality of queried word features to obtain the sentence feature of the target sentence according to an arrangement order of the plurality of words in the target sentence.

The headword extraction module 904 is configured to determine the word corresponding to the largest probability among the plurality of probabilities as the headword of the target sentence.

In another implementation, the headword extraction model includes a residual path, a trunk path, a semantic feature matching layer, and an output layer. The residual path is configured to extract a semantic feature of an input sentence. The trunk path is configured to extract a semantic feature of each word in the input sentence. The semantic feature matching layer and the output layer are configured to obtain a matching degree between the semantic feature of the word in the input sentence and the semantic feature of the input sentence.

In another implementation, referring to FIG. 10, the apparatus further includes:
a sample obtaining module 906, configured to obtain a sample sentence and a sample probability corresponding to each sample word in the sample sentence, the sample probability being used for representing a probability that a corresponding sample word is a headword of the sample sentence;
a predicted probability obtaining module 907, configured to invoke the headword extraction model to process the sample sentence, so as to obtain a predicted matching degree corresponding to the sample word,
the predicted probability obtaining module 907 being further configured to normalize predicted matching degrees corresponding to a plurality of sample words to obtain a predicted probability corresponding to the sample word, so that a sum of predicted probabilities corresponding to the plurality of sample words is 1; and
a model training module 908, configured to train the headword extraction model according to a sample probability and the predicted probability corresponding to the sample word.

In another implementation, referring to FIG. 10, the model training module 908 is configured to:
obtain a product of the sample probability and a logarithm of the predicted probability corresponding to the sample word;
use a sum of products corresponding to the plurality of sample words as a loss value corresponding to the sample sentence; and
train the headword extraction model according to the loss value.

In another implementation, the headword extraction module 904 is configured to:
normalize matching degrees corresponding to a plurality of words to obtain a probability corresponding to each matching degree, so that a sum of probabilities corresponding to the plurality of words is 1, the probability being used for representing a probability that a corresponding word is a headword of a target sentence; and
determine a word corresponding to a largest probability of the plurality of probabilities as the headword of the target sentence.

In another implementation, referring to FIG. 10, the apparatus further includes:
a word segmentation module 909, configured to perform word segmentation on a target sentence to obtain a plurality of words included in the target sentence.

All the optional technical solutions may be combined randomly to form optional embodiments of this application. Details are not described herein again.

When the headword extraction apparatus provided in the foregoing embodiment extracts a headword, it is illustrated with an example of division of each functional module. In actual application, the function distribution may be implemented by different functional modules according to requirements, that is, an internal structure of the computer device is divided into different functional modules, to implement all or some of the functions described above. In addition, the headword extraction apparatus and the headword extraction method embodiments provided in the foregoing embodiments belong to the same concept. For the specific implementation process, reference may be made to the method embodiments, and details are not described herein again. In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 11:
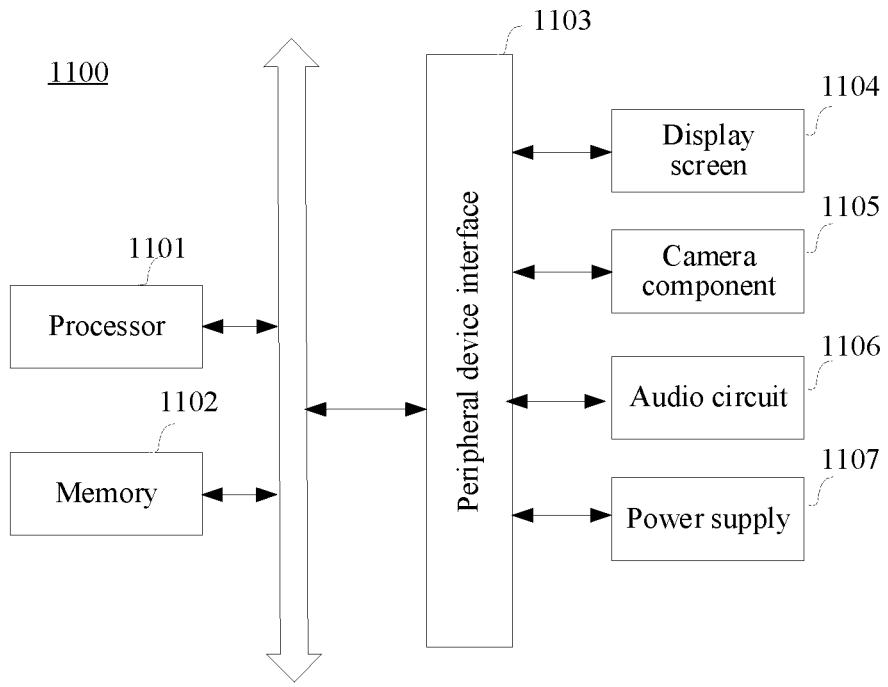
FIG. 11 is a schematic structural diagram of a terminal according to an embodiment of this application.

The following takes the computer device as a terminal as an example for description. FIG. 11 shows a schematic structural diagram of a terminal 1100 according to an exemplary embodiment of this application. The terminal 1100 includes: a processor 1101 and a memory 1102.

The processor 1101 may include one or more processing cores, for example, a 4-core processor or an 8-core processor. The processor 1101 may be implemented in at least one hardware form of digital signal processor (DSP), a field-programmable gate array (FPGA), and a programmable logic array (PLA).

The memory 1102 may include one or more computer-readable storage media. The computer-readable storage media may be non-transitory. The memory 1102 may further include a high-speed random access memory (RAM) and a non-volatile memory, such as one or more magnetic disk storage devices or flash storage devices. In some embodiments, a non-transitory computer-readable storage medium in the memory 1102 is configured to store at least one instruction, and the at least one instruction is configured to be executed by the processor 1101 to implement the headword extraction method provided in the method embodiments of this application.

In some embodiments, the terminal 1100 may optionally include: a peripheral device interface 1103 and at least one peripheral device. The processor 1101, the memory 1102, and the peripheral device interface 1103 may be connected by using a bus or a signal cable. Each peripheral device may be connected to the peripheral device interface 1103 by using a bus, a signal cable, or a circuit board. Specifically, the peripheral device includes: at least one of a display screen 1104, a camera component 1105, an audio circuit 1106, and a power supply 1107.

A person skilled in the art may understand that the structure shown in FIG. 11 does not constitute a limitation to the terminal 1100, and the terminal may include more components or fewer components than those shown in the figure, or some components may be combined, or a different component deployment may be used.

Figure 12:
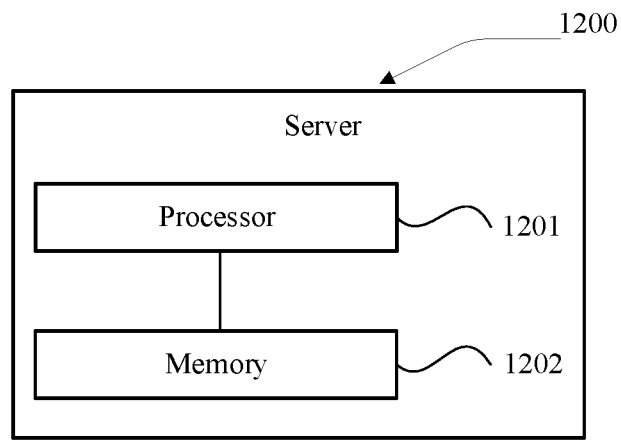
FIG. 12 is a schematic structural diagram of a server according to an embodiment of this application.

FIG. 12 is a schematic structural diagram of a server according to an embodiment of this application. The server 1200 may vary greatly due to different configurations or performance, and may include one or more central processing units (CPUs) 1201 and one or more memories 1202. The memory 1202 stores at least one instruction, the at least one instruction being loaded and executed by the CPU 1201 to implement the methods provided in the foregoing method embodiments. Certainly, the server may further include a wired or wireless network interface, a keyboard, an input/output (I/O) interface and other components to facilitate inputs/outputs. The server may further include other components for implementing device functions. Details are not described herein again.

The server 1200 may be configured to perform steps performed by the server in the above headword extraction method.

An embodiment of this application further provides a computer device, including a processor and a memory, the memory storing at least one instruction, the at least one instruction being loaded and executed by the processor to implement the following operations:

obtaining a sentence feature of a target sentence and a word feature of each word in the target sentence;
 extracting semantics of the sentence feature of the target sentence to obtain a semantic feature of the target sentence, and extracting semantics of the word feature of the word to obtain a semantic feature of the word, the semantic feature of the target sentence being used for representing global semantics of the target sentence, and the semantic feature of the word being used for representing local semantics of the word;
 obtaining a matching degree between the semantic feature of the word and the semantic feature of the target sentence; and
 determining, among a plurality of words in the target sentence, a word with a largest corresponding matching degree as a headword of the target sentence.

In one implementation, the at least one instruction is loaded and executed by the processor to implement the following operations:

subtracting the semantic feature of the word from the semantic feature of the target sentence to obtain a differential semantic feature corresponding to the word; and
 determining a matching degree corresponding to the word according to the differential semantic feature corresponding to the word.

In one implementation, the at least one instruction is loaded and executed by the processor to implement the following operations:

adding the semantic feature of the word and the semantic feature of the target sentence to obtain a fused semantic feature corresponding to the word; and determining the matching degree corresponding to the word according to the fused semantic feature corresponding to the word.

In one implementation, the at least one instruction is loaded and executed by the processor to implement the following operations:

adjusting the differential semantic feature corresponding to the word to obtain an adjusted differential semantic feature; and
 obtaining the matching degree corresponding to the word according to the adjusted differential semantic feature corresponding to the word.

In one implementation, the at least one instruction is loaded and executed by the processor to implement the following operations:

querying a word feature of the word according to a mapping relationship, the mapping relationship including a word and a corresponding word feature; and
 combining a plurality of queried word features to obtain the sentence feature of the target sentence according to an arrangement order of the plurality of words in the target sentence.

In one implementation, the method is performed based on a headword extraction model. The headword extraction model includes a residual path, a trunk path, a semantic feature matching layer, and an output layer. The residual path is configured to extract a semantic feature of an input sentence. The trunk path is configured to extract a semantic feature of each word in the input sentence. The semantic feature matching layer and the output layer are configured to obtain a matching degree between the semantic feature of the word in the input sentence and the semantic feature of the input sentence.

In one implementation, the at least one instruction is loaded and executed by the processor to implement the following operations:

obtaining a sample sentence and a sample probability corresponding to each sample word in the sample sentence, the sample probability being used for representing a probability that a corresponding sample word is a headword of the sample sentence;
 invoking the headword extraction model to process the sample sentence, so as to obtain a predicted matching degree corresponding to the sample word;
 normalizing predicted matching degrees corresponding to a plurality of sample words to obtain a predicted probability corresponding to the sample word, so that a sum of predicted probabilities corresponding to the plurality of sample words is 1; and
 training the headword extraction model according to the sample probability and the predicted probability corresponding to the sample word.

In one implementation, the at least one instruction is loaded and executed by the processor to implement the following operations:

obtaining a product between the sample probability and a logarithm of the predicted probability corresponding to the sample word;
 using a sum of products corresponding to the plurality of sample words as a loss value corresponding to the sample sentence; and
 training the headword extraction model according to the loss value.

In one implementation, the at least one instruction is loaded and executed by the processor to implement the following operations:

normalizing matching degrees corresponding to a plurality of words to obtain a probability corresponding to each matching degree, so that a sum of probabilities corresponding to the plurality of words is 1, the probability being used for representing a probability that a corresponding word is a headword of a target sentence; and determining a word corresponding to a largest probability of the plurality of probabilities as the headword of the target sentence.

In one implementation, the at least one instruction is loaded and executed by the processor to implement the following operations:

performing word segmentation on the target sentence to obtain a plurality of words included in the target sentence.

An embodiment of this application further provides a computer-readable storage medium, storing at least one instruction, the at least one instruction being loaded and executed by a processor to implement the following operations:

obtaining a sentence feature of a target sentence and a word feature of each word in the target sentence;

extracting semantics of the sentence feature of the target sentence to obtain a semantic feature of the target sentence, and extracting semantics of the word feature of the word to obtain a semantic feature of the word, the semantic feature of the target sentence being used for representing global semantics of the target sentence, and the semantic feature of the word being used for representing local semantics of the word;

obtaining a matching degree between the semantic feature of the word and the semantic feature of the target sentence; and determining a word with a largest corresponding matching degree as a headword of the target sentence among a plurality of words in the target sentence.

In one implementation, the at least one instruction is loaded and executed by the processor to implement the following operations:

subtracting the semantic feature of the word from the semantic feature of the target sentence to obtain a differential semantic feature corresponding to the word; and determining a matching degree corresponding to the word according to the differential semantic feature corresponding to the word.

In one implementation, the at least one instruction is loaded and executed by the processor to implement the following operations:

adding the semantic feature of the word and the semantic feature of the target sentence to obtain a fused semantic feature corresponding to the word; and determining the matching degree corresponding to the word according to the fused semantic feature corresponding to the word.

In one implementation, the at least one instruction is loaded and executed by the processor to implement the following operations:

adjusting the differential semantic feature corresponding to the word to obtain an adjusted differential semantic feature; and obtaining the matching degree corresponding to the word according to the adjusted differential semantic feature corresponding to the word.

In one implementation, the at least one instruction is loaded and executed by the processor to implement the following operations:

querying a word feature of the word according to a mapping relationship, the mapping relationship including a word and a corresponding word feature; and combining a plurality of queried word features to obtain the sentence feature of the target sentence according to an arrangement order of the plurality of words in the target sentence.

In one implementation, the method is performed based on a headword extraction model. The headword extraction model includes a residual path, a trunk path, a semantic feature matching layer, and an output layer. The residual path is configured to extract a semantic feature of an input sentence. The trunk path is configured to extract a semantic feature of each word in the input sentence. The semantic feature matching layer and the output layer are configured to obtain a matching degree between the semantic feature of the word in the input sentence and the semantic feature of the input sentence.

In one implementation, the at least one instruction is loaded and executed by the processor to implement the following operations:

obtaining a sample sentence and a sample probability corresponding to each sample word in the sample sentence, the sample probability being used for representing a probability that a corresponding sample word is a headword of the sample sentence;

invoking the headword extraction model to process the sample sentence, so as to obtain a predicted matching degree corresponding to the sample word;

normalizing predicted matching degrees corresponding to a plurality of sample words to obtain a predicted probability corresponding to the sample word, so that a sum of predicted probabilities corresponding to the plurality of sample words is 1; and training the headword extraction model according to the sample probability and the predicted probability corresponding to the sample word.

In one implementation, the at least one instruction is loaded and executed by the processor to implement the following operations:

obtaining a product between the sample probability and a logarithm of the predicted probability corresponding to the sample word;

using a sum of products corresponding to the plurality of sample words as a loss value corresponding to the sample sentence; and training the headword extraction model according to the loss value.

In one implementation, the at least one instruction is loaded and executed by the processor to implement the following operations:

normalizing matching degrees corresponding to a plurality of words to obtain a probability corresponding to each matching degree, so that a sum of probabilities corresponding to the plurality of words is 1, the probability being used for representing a probability that a corresponding word is a headword of a target sentence; and determining a word corresponding to a largest probability of the plurality of probabilities as the headword of the target sentence.

In one implementation, the at least one instruction is loaded and executed by the processor to implement the following operations:

performing word segmentation on the target sentence to obtain a plurality of words included in the target sentence.

An embodiment of this application further provides a computer program, storing at least one instruction, the at least one instruction being loaded and executed by a processor to implement operations performed in the headword extraction method of the foregoing embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of the embodiments of this application, but are not intended to limit the embodiments of this application. Any modification, equivalent replacement, or improvement made within the spirit and principle of the embodiments of this application shall fall within the protection scope of this application.

What is claimed is:

1. A headword extraction method performed by a computer device, the method comprising:
   obtaining a sentence feature of a target sentence and word features of a plurality of words in the target sentence;
   extracting semantics of the sentence feature of the target sentence to obtain a semantic feature of the target sentence, the semantic feature of the target sentence being used for representing global semantics of the target sentence;
   extracting semantics of the word feature of each word of the plurality of words to obtain a semantic feature of the word, the semantic feature of the word being used for representing local semantics of the word;
   obtaining a respective matching degree between the semantic feature of each word of the plurality of words and the semantic feature of the target sentence, further comprising:
      subtracting the semantic feature of the word from the semantic feature of the target sentence to obtain a differential semantic feature corresponding to the word; and
      determining the matching degree corresponding to the word according to the differential semantic feature corresponding to the word, wherein the matching degree corresponding to the word is negatively correlated with the differential semantic feature corresponding to the word such that the larger the differential semantic feature corresponding to the word, the smaller a probability that semantics of the word reflect semantics of the target sentence and the smaller the differential semantic feature corresponding to the word, the larger the probability that the semantics of the word reflect the semantics of the target sentence; and
   determining, among the plurality of words in the target sentence, a word with a largest corresponding matching degree as a headword of the target sentence.

2. The method according to claim 1, wherein the obtaining a respective matching degree between the semantic feature of each word and the semantic feature of the target sentence comprises:
   adding the semantic feature of the word and the semantic feature of the target sentence to obtain a fused semantic feature corresponding to the word; and
   determining the matching degree corresponding to the word according to the fused semantic feature corresponding to the word.

3. The method according to claim 1, wherein after the subtracting the semantic feature of the word from the semantic feature of the target sentence to obtain a differential semantic feature corresponding to the word, the method further comprises:
   adjusting the differential semantic feature corresponding to the word to obtain an adjusted differential semantic feature; and
   the determining the matching degree corresponding to the word according to the differential semantic feature corresponding to the word comprises:
   obtaining the matching degree corresponding to the word according to the adjusted differential semantic feature corresponding to the word.

4. The method according to claim 1, wherein the obtaining a sentence feature of a target sentence and word features of a plurality of words in the target sentence comprises:
   querying the word feature of at least one word of the plurality of words in the target sentence according to a mapping relationship, the mapping relationship comprising a word and a corresponding word feature; and
   combining a plurality of queried word features according to an arrangement order of the plurality of words in the target sentence, to obtain the sentence feature of the target sentence.

5. The method according to claim 1, wherein the method is performed based on a headword extraction model, and the headword extraction model comprises a residual path, a trunk path, a semantic feature matching layer, and an output layer,
   the residual path being configured to extract a semantic feature of an input sentence, the trunk path being configured to extract a semantic feature of each word in the input sentence, and the semantic feature matching layer and the output layer being configured to obtain a matching degree between the semantic feature of each word in the input sentence and the semantic feature of the input sentence.

6. The method according to claim 5, wherein a training process of the headword extraction model comprises:
   obtaining a sample sentence and a sample probability corresponding to each sample word in the sample sentence, the sample probability being used for representing a probability that a corresponding sample word is a headword of the sample sentence;
   invoking the headword extraction model to process the sample sentence, so as to obtain a predicted matching degree corresponding to each sample word;
   normalizing the predicted matching degrees corresponding to the plurality of sample words to obtain a predicted probability corresponding to each sample word, so that a sum of the predicted probabilities corresponding to the plurality of sample words is 1; and
   training the headword extraction model according to the sample probability and the predicted probability corresponding to the sample word.

7. The method according to claim 6, wherein the training the headword extraction model according to the sample probability and the predicted probability corresponding to each sample word comprises:
   obtaining a product between the sample probability and a logarithm of the predicted probability corresponding to the sample word;

using a sum of products corresponding to the plurality of sample words as a loss value corresponding to the sample sentence; and training the headword extraction model according to the loss value.

8. The method according to claim 1, wherein the determining, among the plurality of words in the target sentence, a word with a largest corresponding matching degree as a headword of the target sentence comprises:

normalizing the matching degrees corresponding to the plurality of words to obtain a probability corresponding to each matching degree, so that a sum of probabilities corresponding to the plurality of words is a constant, the probability being used for representing a probability that a corresponding word is a headword of the target sentence; and determining a word corresponding to a largest probability of the plurality of probabilities as the headword of the target sentence.

9. The method according to claim 1, wherein before the obtaining a sentence feature of a target sentence and word features of a plurality of words in the target sentence, the method further comprises:

performing word segmentation on the target sentence to obtain the plurality of words comprised in the target sentence.

10. A computer device, comprising a processor and a memory, the memory storing at least one instruction, the at least one instruction being loaded and executed by the processor to implement a headword extraction method including:

obtaining a sentence feature of a target sentence and word features of a plurality of words in the target sentence;

extracting semantics of the sentence feature of the target sentence to obtain a semantic feature of the target sentence, the semantic feature of the target sentence being used for representing global semantics of the target sentence;

extracting semantics of the word feature of each word of the plurality of words to obtain a semantic feature of the word, the semantic feature of the word being used for representing local semantics of the word;

obtaining a respective matching degree between the semantic feature of each word of the plurality of words and the semantic feature of the target sentence, further comprising:

subtracting the semantic feature of the word from the semantic feature of the target sentence to obtain a differential semantic feature corresponding to the word; and determining the matching degree corresponding to the word according to the differential semantic feature corresponding to the word, wherein the matching degree corresponding to the word is negatively correlated with the differential semantic feature corresponding to the word such that the larger the differential semantic feature corresponding to the word, the smaller a probability that semantics of the word reflect semantics of the target sentence and the smaller the differential semantic feature corresponding to the word, the larger the probability that the semantics of the word reflect the semantics of the target sentence; and determining, among the plurality of words in the target sentence, a word with a largest corresponding matching degree as a headword of the target sentence.

11. The computer device according to claim 10, wherein the obtaining a respective matching degree between the semantic feature of each word and the semantic feature of the target sentence comprises:

adding the semantic feature of the word and the semantic feature of the target sentence to obtain a fused semantic feature corresponding to the word; and determining the matching degree corresponding to the word according to the fused semantic feature corresponding to the word.

12. The computer device according to claim 10, wherein the obtaining a sentence feature of a target sentence and word features of a plurality of words in the target sentence comprises:

querying the word feature of at least one word of the plurality of words in the target sentence according to a mapping relationship, the mapping relationship comprising a word and a corresponding word feature; and combining a plurality of queried word features according to an arrangement order of the plurality of words in the target sentence, to obtain the sentence feature of the target sentence.

13. The computer device according to claim 10, wherein the method is performed based on a headword extraction model, and the headword extraction model comprises a residual path, a trunk path, a semantic feature matching layer, and an output layer, the residual path being configured to extract a semantic feature of an input sentence, the trunk path being configured to extract a semantic feature of each word in the input sentence, and the semantic feature matching layer and the output layer being configured to obtain a matching degree between the semantic feature of each word in the input sentence and the semantic feature of the input sentence.

14. The computer device according to claim 10, wherein the determining, among the plurality of words in the target sentence, a word with a largest corresponding matching degree as a headword of the target sentence comprises:

normalizing the matching degrees corresponding to the plurality of words to obtain a probability corresponding to each matching degree, so that a sum of probabilities corresponding to the plurality of words is a constant, the probability being used for representing a probability that a corresponding word is a headword of the target sentence; and determining a word corresponding to a largest probability of the plurality of probabilities as the headword of the target sentence.

15. The computer device according to claim 10, wherein before the obtaining a sentence feature of a target sentence and word features of a plurality of words in the target sentence, the method further comprises:

performing word segmentation on the target sentence to obtain the plurality of words comprised in the target sentence.

16. A non-transitory computer-readable storage medium, storing at least one instruction, the at least one instruction being loaded and executed by a processor of a computer device to implement a headword extraction method including:

obtaining a sentence feature of a target sentence and word features of a plurality of words in the target sentence;

extracting semantics of the sentence feature of the target sentence to obtain a semantic feature of the target sentence, the semantic feature of the target sentence being used for representing global semantics of the target sentence;

extracting semantics of the word feature of each word of the plurality of words to obtain a semantic feature of the word, the semantic feature of the word being used for representing local semantics of the word;

obtaining a respective matching degree between the semantic feature of each word of the plurality of words and the semantic feature of the target sentence, further comprising:
- subtracting the semantic feature of the word from the semantic feature of the target sentence to obtain a differential semantic feature corresponding to the word; and
- determining the matching degree corresponding to the word according to the differential semantic feature corresponding to the word, wherein the matching degree corresponding to the word is negatively correlated with the differential semantic feature corresponding to the word such that the larger the differential semantic feature corresponding to the word, the smaller a probability that semantics of the word reflect semantics of the target sentence and the smaller the differential semantic feature corresponding to the word, the larger the probability that the semantics of the word reflect the semantics of the target sentence; and determining, among the plurality of words in the target sentence, a word with a largest corresponding matching degree as a headword of the target sentence.

17. The non-transitory computer-readable storage medium according to claim 16, wherein the determining, among the plurality of words in the target sentence, a word with a largest corresponding matching degree as a headword of the target sentence comprises:
- normalizing the matching degrees corresponding to the plurality of words to obtain a probability corresponding to each matching degree, so that a sum of probabilities corresponding to the plurality of words is a constant, the probability being used for representing a probability that a corresponding word is a headword of the target sentence; and
- determining a word corresponding to a largest probability of the plurality of probabilities as the headword of the target sentence.

18. The non-transitory computer-readable storage medium according to claim 16, wherein before the obtaining a sentence feature of a target sentence and word features of a plurality of words in the target sentence, the method further comprises:
- performing word segmentation on the target sentence to obtain the plurality of words comprised in the target sentence.

* * * * *